US011141331B2

(12) United States Patent
Gingras et al.

(10) Patent No.: US 11,141,331 B2
(45) Date of Patent: Oct. 12, 2021

(54) WHEELCHAIR CASTER ASSEMBLY WITH ANTI-FLUTTER FEATURE

(71) Applicant: MOTION COMPOSITES INC., Saint-Roch-de-l'Achigan (CA)

(72) Inventors: David Gingras, L'Assomption (CA); Pierre-Andre Couture, Laval (CA); Michael Archambault Berube, Saint-Roch-de-l'Achigan (CA)

(73) Assignee: MOTION COMPOSITES INC., Saint-Roch-de-l'Achigan (CA)

( * ) Notice: Subject to any disclaimer, the term of this patent is extended or adjusted under 35 U.S.C. 154(b) by 264 days.

(21) Appl. No.: 16/481,272

(22) PCT Filed: Jan. 26, 2018

(86) PCT No.: PCT/CA2018/050093
§ 371 (c)(1),
(2) Date: Jul. 26, 2019

(87) PCT Pub. No.: WO2018/137038
PCT Pub. Date: Aug. 2, 2018

(65) Prior Publication Data
US 2019/0374414 A1    Dec. 12, 2019

Related U.S. Application Data

(60) Provisional application No. 62/450,742, filed on Jan. 26, 2017.

(51) Int. Cl.
*F16C 25/02*   (2006.01)
*A61G 5/10*    (2006.01)
(Continued)

(52) U.S. Cl.
CPC ............ *A61G 5/10* (2013.01); *B60B 33/0026* (2013.01); *B60B 33/0065* (2013.01);
(Continued)

(58) Field of Classification Search
CPC .... A61G 5/10; B60B 33/0026; B60B 33/006; B60B 33/0065; B60B 33/0068;
(Continued)

(56) References Cited

U.S. PATENT DOCUMENTS 1,417,652 A * 5/1922 Wood ................. B41F 13/28
                                                101/219
2,181,722 A    11/1939 Butter et al.
(Continued)

OTHER PUBLICATIONS https://www.quickie-wheelchairs.com/replacement-parts/sunrise-medical/quickie-qm-7-series/base/fork-and-caster Name: Quickie Qm-7 SEries: Fork and Caster Manufacturer: Sunrise Medical.
(Continued)

*Primary Examiner* — Phillip A Johnson
(74) *Attorney, Agent, or Firm* — Norton Rose Fulbright Canada LLP

(57) ABSTRACT

A housing unit for a caster assembly comprising a hollow housing body forming an inner cavity. A first bearing is connected to the hollow housing body, the first bearing defining a rotational axis through its center, and configured to rotatably support a first portion of a stem supporting a caster for rotation about the rotational axis. A support assembly is connected to the hollow housing body, the support assembly being spaced from the first bearing, the support assembly having bearing segments concurrently defining a plain bearing around the rotational axis, the plain bearing configured to rotatably support a second portion of the stem during rotation about the rotational axis. A pressure-applying component is operatively mounted to the support assembly, the pressure-applying component being selectively displaceable to displace the at least one of the bearing segments toward or away from the second portion of the stem, to increase or decrease a pressure of the bearing segments on the second portion of the stem. The support (Continued)

assembly and the first bearing are configured to rotatably support the stem of the caster to form a swivel joint.

21 Claims, 5 Drawing Sheets

(51) Int. Cl.
*B60B 33/00* (2006.01)
*F16C 17/00* (2006.01)
*F16C 33/02* (2006.01)
(52) U.S. Cl.
CPC .......... *B60B 33/0068* (2013.01); *F16C 17/00* (2013.01); *F16C 25/02* (2013.01); *F16C 33/02* (2013.01); *B60B 2200/26* (2013.01); *B60B 2380/12* (2013.01); *B60B 2900/131* (2013.01)
(58) Field of Classification Search
CPC ...... B60B 33/0076; F16C 17/02; F16C 17/26; F16C 23/02; F16C 25/02; F16C 33/046; F16C 2229/00; F16C 2326/02
USPC .......................................................... 16/35 D
See application file for complete search history.

(56) References Cited

U.S. PATENT DOCUMENTS

| | | | |
|---|---|---|---|
| 4,805,260 A | 2/1989 | Tooth | |
| 4,969,232 A | 11/1990 | Michel | |
| 6,944,910 B2 | 9/2005 | Pauls | |
| 8,413,295 B2 * | 4/2013 | Campbell | ............. B60B 33/045 16/35 D |
| 2004/0004331 A1 | 1/2004 | Pauls | |
| 2008/0309048 A1 * | 12/2008 | Kohler | ................ B60B 33/0073 280/250.1 |
| 2016/0339741 A1 * | 11/2016 | Redington | ............ B60B 33/028 |
| 2017/0340494 A1 | 11/2017 | Van de Wal et al. | |

OTHER PUBLICATIONS https://www.quickie-wheelchairs.com/replacement-parts/sunnse-medical/quickie-gp-gpv-gpsa-gp-ti/base-frame/casters-forks/hp-caster-plate Name: Quickie GP/GPV/GPSA/GP Ti: Hp Caster Plate Manufacturer: Sunrise Medical.
https://www.quickie-wheelchairs.com/replacement-parts/sunrise-medical/quickie-qh/base-frame/casters-and-forks/caster-housing Name: Quickie QRi: Caster Housing Manufacturer: Sunrise Medical.
https://www.quickie-wheelchairs.com/replacement-parts/sunrise-medical/quickie-s646-s646se-s636-s626/base/anti-tip/anti-tip-caster-assembly Name: Quickie S646/ S646SE/ S636/ S626: Anti-tip Caster Assembly Manufacturer: Sunrise Medical.
https://www.quickie-wheelchairs.com/replacement-parts/sunrise-medical/quickie-s646-s646se-s636-s626/base/casters-and-forks/caster-fork-s636-s646-s646se Name: Quickie S646/ S646SE/ S636/ S626: Caster & Fork S636/s646/s646se Manufacturer: Sunrise Medical.
https://www.quickie-wheelchairs.com/replacement-parts/sunrise-medical/quickie-q7/base-frame/caster-and-forks/fork-and-stem-assembly/standard-multiple-position-fork Name: Quickie Q7: Standard Multiple Position Fork Manufacturer: Sunrise Medical.
http://www.sunparts.us/partscatalog/media/anti-flutter_kit_is00114.pdf Instruction Sheet Anti Flutter Kit Installation Manufacturer: Sunrise Medical.
http://www.invacare.ca/parts/assembly/92_44.pdf Manufacturer : INVACARE Name : Rehab Shower/Commode Chair Parts Catalog.

* cited by examiner

WHEELCHAIR CASTER ASSEMBLY WITH ANTI-FLUTTER FEATURE

CROSS-REFERENCE TO RELATED APPLICATION

The present application claims the priority of U.S. Provisional Patent Application Ser. No. 62/450,742, filed on Jan. 26, 2017 and incorporated herein by reference.

TECHNICAL FIELD

The present application relates to wheelchairs and, more particularly, to an anti-flutter configuration for front caster assemblies of wheelchairs.

BACKGROUND OF THE ART

Wheelchairs are commonly provided with a pair of large rear drive wheels, with smaller front wheels, also known as casters or casters wheels. The caster assemblies, in addition to enabling a rotation of the caster wheels, often feature a swivel joint to allow directional movement of the caster wheels, for the direction of the wheelchair to be controlled. As is conventional, the swivel joint of a caster assembly includes one or more bearings allowing a rotational movement of the caster wheel about a generally upright axis. The bearing(s) provide a smooth rotation of the caster wheel relative to a housing of the caster assembly.

Such caster assemblies may be known to experience flutter in some instances. Indeed, when the wheelchair rolls along, the combination of velocity, friction and limited contact surface between caster wheel and ground, and reduced swivel resistance may cause flutter, i.e., an uncontrollable reciprocating motion of the caster wheel. Caster wheel flutter may cause a loss of directional control for the wheelchair, a premature wear of parts, and may be noisy, among other effects.

SUMMARY

It is an aim of the present disclosure to provide a caster wheel assembly that addresses issues associated with the prior art.

Therefore, in accordance with a first embodiment of the present disclosure, there is provided a housing unit for a caster assembly comprising: a hollow housing body forming an inner cavity; a first bearing connected to the hollow housing body, the first bearing defining a rotational axis through its center, and configured to rotatably support a first portion of a stem supporting a caster for rotation about the rotational axis; a support assembly connected to the hollow housing body, the support assembly being spaced from the first bearing, the support assembly having bearing segments concurrently defining a plain bearing around the rotational axis, the plain bearing configured to rotatably support a second portion of the stem during rotation about the rotational axis; and a pressure-applying component operatively mounted to the support assembly, the pressure-applying component being selectively displaceable to displace the at least one of the bearing segments toward or away from the second portion of the stem, to increase or decrease a pressure of the bearing segments on the second portion of the stem; wherein the support assembly and the first bearing are configured to rotatably support the stem of the caster to form a swivel joint.

Further in accordance with the first embodiment, a wedge is positioned in a gap between two of the bearing segments, a displacement of the pressure-applying component causing a wedging effect of the wedge on the two of the bearing segments.

Still further in accordance with the first embodiment, the wedge and the bearing segments are integrally formed into a monolithic piece.

Still further in accordance with the first embodiment, the bearing segments are connected to an annular support.

Still further in accordance with the first embodiment, the bearing segments and the annular support concurrently define a receptacle configured to receive a fastener or head of the stem.

Still further in accordance with the first embodiment, further comprising a cap for being mounted to a top open end of the hollow housing body.

Still further in accordance with the first embodiment, an annular body projects downwardly from the cap and for being received in the inner cavity via the top open end.

Still further in accordance with the first embodiment, the cap forms a flange relative to the annular body.

Still further in accordance with the first embodiment, the cap has a top opening configured for receiving a top of the stem.

Still further in accordance with the first embodiment, a pivot connector is on the hollow housing body adapted for pivoting engagement to a frame of a wheelchair.

Still further in accordance with the first embodiment, a collar is slidingly engaged on the frame of the wheelchair, and an arm pivotally connected to the collar and the housing body to convert a translation of the collar along the frame to a rotation of the housing body via the pivot connector.

Still further in accordance with the first embodiment, the pressure-applying component is a plunger translating relative to the support assembly to displace the at least one of the bearing segments.

Still further in accordance with the first embodiment, a direction of translation of the plunger is generally parallel to the rotational axis.

Still further in accordance with the first embodiment, the plunger has a top interface end accessible from a top surface of the support assembly.

Still further in accordance with the first embodiment, the plunger is a screw received in a threaded hole of the support assembly.

Still further in accordance with the first embodiment, the screw is a set screw having a socket accessible from a top surface of the support assembly.

Still further in accordance with the first embodiment, the support assembly is a monolithic component.

Still further in accordance with the first embodiment, the plain bearing has at least three of the bearing segments separated from one another by a gap.

In accordance with a second embodiment of the present disclosure, there is provided a system of a housing unit and caster assembly comprising: the housing unit as described above; and the caster assembly including the stem, a caster and means to rollingly support the caster at an end of the stem.

Still further in accordance with the second embodiment, the first portion of the stem and the second portion of the stem are cylindrical, the second portion of the stem having a smaller diameter than the first portion of the stem.

Still further in accordance with the second embodiment, the stem has a frusto-conical portion between the first portion and the second portion.

Still further in accordance with the second embodiment, the stem has an open threaded top end, the caster assembly further comprising a bolt operatively engaged into the open threaded top end of the stem to hold the caster assembly to the housing unit.

Still further in accordance with the second embodiment, comprising a biasing unit is between the fastener and the support assembly.

Still further in accordance with the second embodiment, the means is a fork rollingly supporting the caster at the end of the stem.

DETAILED DESCRIPTION

Figure 1:
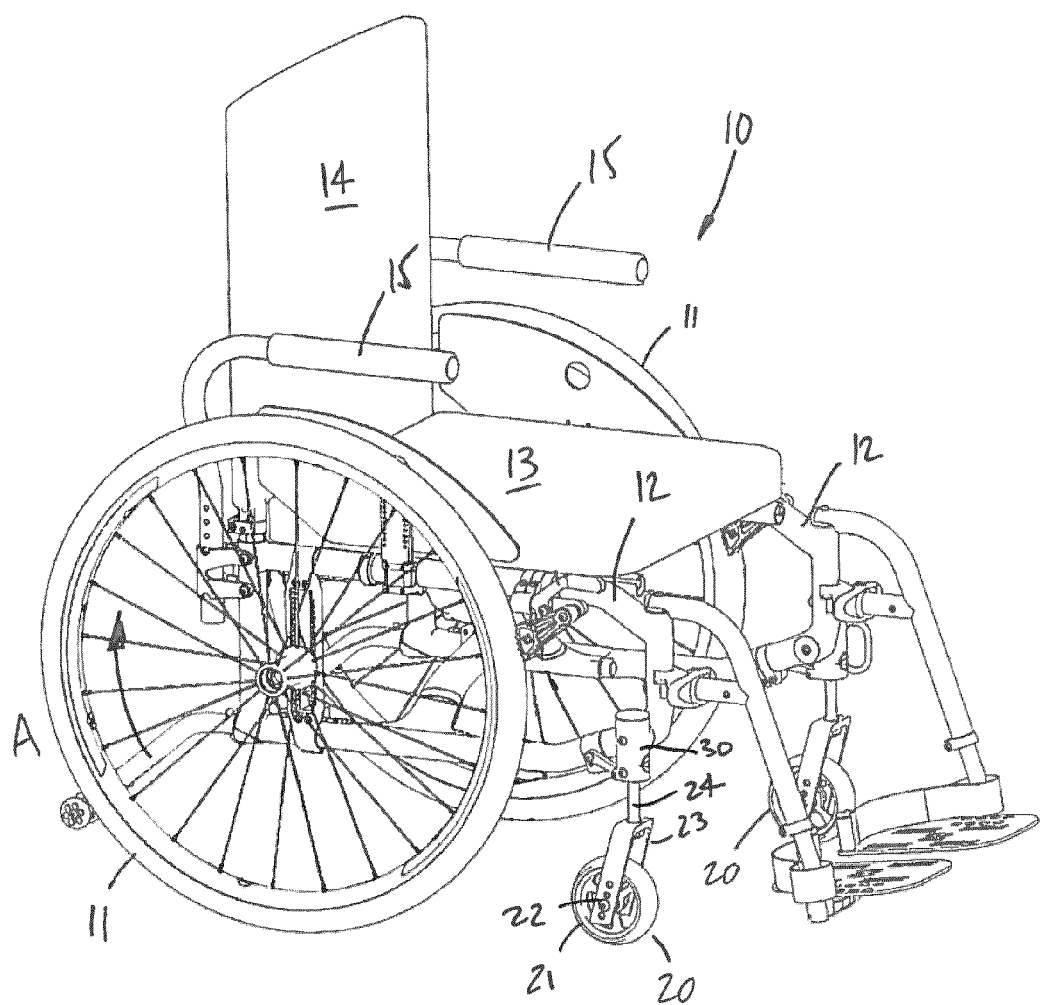
FIG. 1 is a perspective view of a wheelchair featuring caster assemblies in accordance with the present disclosure.

Referring to the drawings and, more particularly, to FIG. 1, a wheelchair with an anti-flutter configuration is generally shown at 10. The wheelchair 10 has rear drive wheels 11 and a frame 12 having a plurality of tubular frame members, a monocoque tubular frame, etc, the frame 12 forming the structure supporting a plurality of components, such as rear wheel mounting brackets, a brake system, foot rests, etc. While not described in full detail as the anti-flutter configuration may be found in wheelchairs having other configurations, the frame 12 interfaces the wheels 11 to a seat 13, a backrest 14, armrests 15 and/or caster assemblies 20, among other components. For clarity, the rolling direction of the wheel 11 in a forward movement of the chair is illustrated by A.

Figure 2:
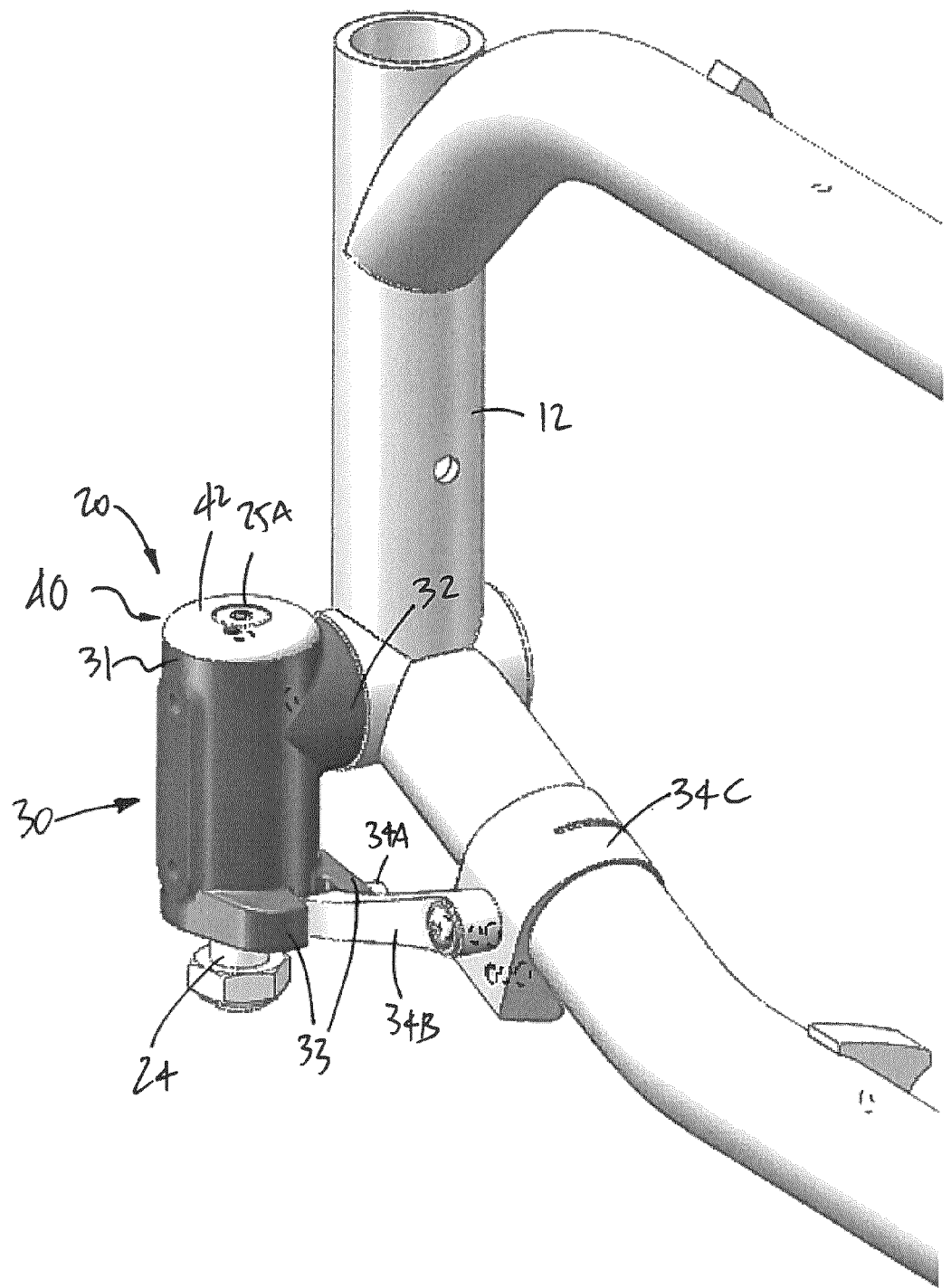
FIG. 2 is a perspective view of a housing unit and stem of one of caster assemblies of FIG. 1.
Figure 3:
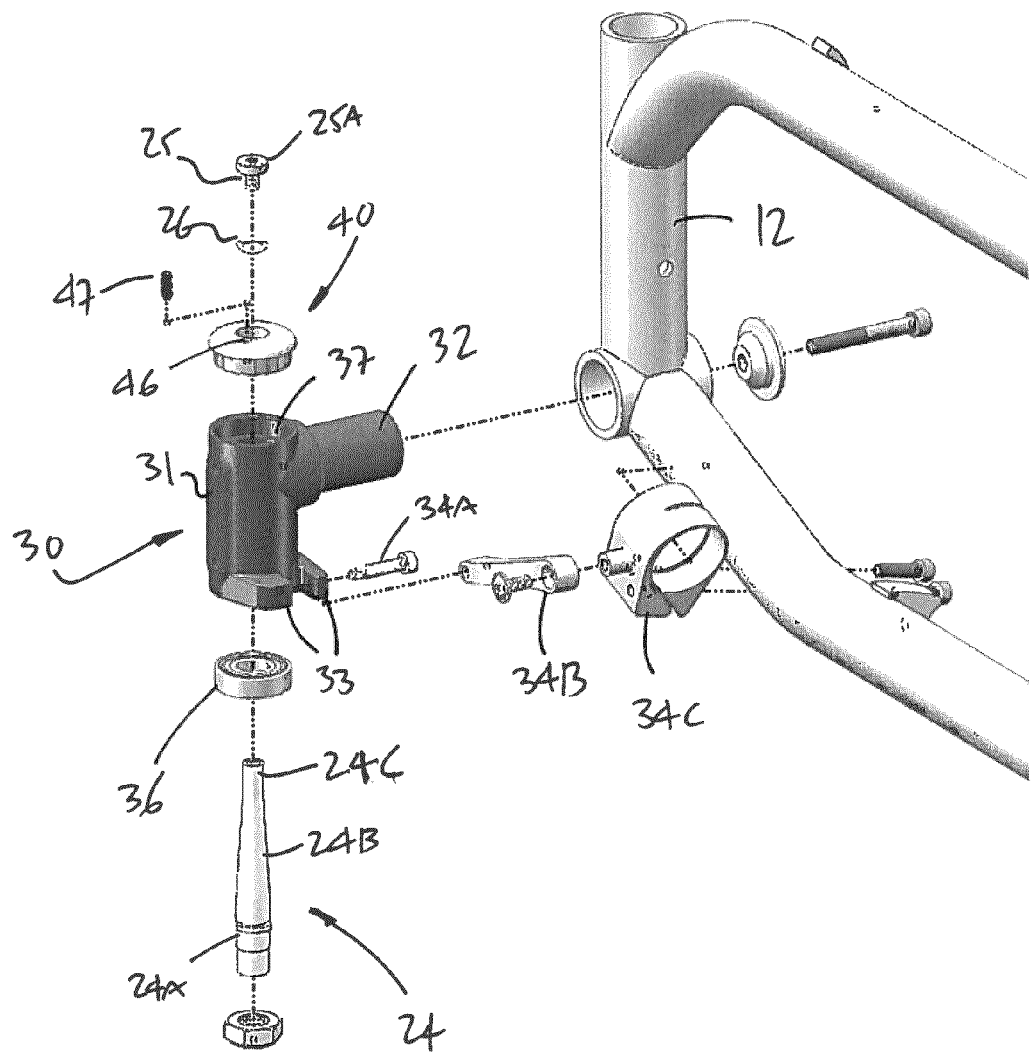
FIG. 3 is an exploded view of the housing unit of FIG. 2.

Referring concurrently to FIGS. 2 and 3, one of the caster assemblies 20 is shown in greater detail. Although the wheelchair 10 may have a single one of the caster assemblies 20, according to an embodiment the wheelchair as two of the caster assemblies 20. The expression "caster assembly" is used throughout the description for simplicity, but other expressions could be used to describe the assembly 20, such as front wheel assembly or system, etc. The caster assemblies 20 may be configured for use on a left side or a right side of the wheelchair 10, but for simplicity the description will apply to both the left-side assembly and right-side assembly, unless stated otherwise. For example, FIGS. 2 and 3 shows a left-side component, whereas FIG. 1 shows a right-side component, the components being mirror images of one another. Moreover, although the caster assembly 20 is shown as used with the wheelchair 10, other apparatuses may use one or more of the caster assemblies 20, such as strollers, carts, etc, especially wheeled apparatuses configured for being manually displaced.

The caster assembly 20 has a caster wheel 21, also known as a caster, roller, wheel, etc, as shown in FIG. 1. The caster wheel 21 has an axle 22 (also known as axle bolt) by which it is rotatably supported by a fork 23, to roll. Therefore, a rotational axis of the axle 22 is generally parallel to the ground. The expression "generally parallel" entails that the rotational axis may not be perfectly parallel to the ground (e.g., the ground may not be straight), hence a 5-10 degree variation may be possible. The fork 23, also known as a yoke, may have a plurality of hole sets to adjust a vertical position of the caster wheel 21 relative to the fork 23. The caster wheel 21 may have different constructions, including a monolithic elastomeric body (e.g., rubber, plastomer), a tire or solid rubber wheel and rim/hub, a rubber annular interface or wheel on a rim/hub, etc. The caster wheel 21 may or may not have a bearing by which it is rotatably mounted to the axle 22, with bearings including roller bearings, ball bearings, among other possibilities. The axle 22 may be secured to the fork 23 in any appropriate manner, such as with nuts as shown in FIG. 1. Although a dual-leg fork is shown at 23, it is contemplated to have the wheel 21 supported by a single leg (also known as a single-leg fork) or by other arrangements.

Figure 5:
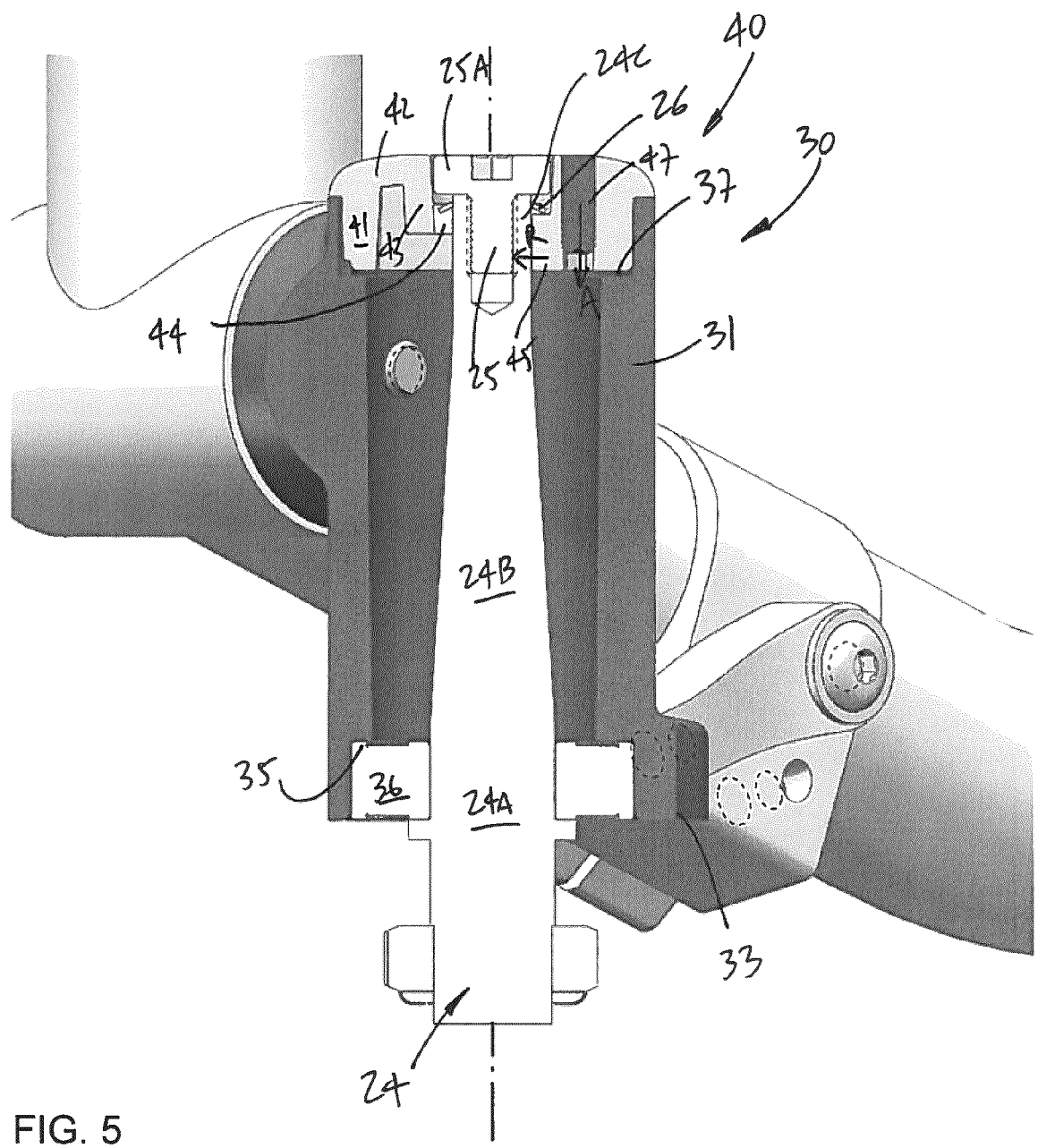
FIG. 5 is an axial section view of one of caster assemblies of FIG. 1.

A stem 24, also known as a shaft or bolt, projects upwardly from the fork 23, and concurrently forms the swivel joint of the caster assembly 20 with a housing unit 30. In an embodiment, the axle 22 could be connected directly to a bottom end of the stem 24 as opposed to being connected to the fork 23. The figures show the fork 23 and the stem 24 being separate comments, with the fork 23 connectable to a bottom of the stem 24, for example by threading engagement. However, the fork 23 and the stem 24 may be integrally connected or fabricated, for instance in a monoblock construction. The caster wheel 21 and fork 23 may rotate about a longitudinal axis of the stem 24, also known and referred to as the rotational axis, in a swivelling action of the caster wheel 21 to adjust a direction of the wheelchair 10. The longitudinal axis of the stem 24 may or may not be normal to the ground, as an adjustment of the orientation of the stem 24 may be possible, as explained below. The stem 24 may be an elongated cylinder, tubular or solid. However, other shapes are considered, for instance to lessen the weight of the caster assembly 20. For example, as shown in FIG. 5, the stem 24 may have a base portion 24A of cylindrical shape, a truncated cone portion 24B (a.k.a., frustoconical) and a tip portion 24C of cylindrical shape, with the stem 24 being supported by bearings against the base portion 24A and the tip portion 24C. Such a configuration results in a lighter stem than one in which the base portion 24A would extend to the tip portion 24C without any reduction in diameter. The base portion 24A has a larger diameter than the tip portion 24C.

As shown in FIGS. 3 and 5, the tip portion 24C of the stem 24 may have an open end (for example with threading as in FIG. 5, or with any other attachment arrangement) if not tubular from the base portion 24A to the tip portion 24C, for a fastener 25 to be engaged into the stem 24. The fastener 25 may be a bolt, for example, but could also be a nut, a circlip, etc. The fastener 25 has a head 25A that will ensure that the stem 24 remains connected to the housing unit 20, as described hereinafter. Moreover, a biasing element 26 may be inserted onto the body of the fastener 25, against an underside of the head 25A. The biasing element 26 may be a coil spring, a wave washer, a curved disc spring, among numerous possible embodiments. Such a biasing element 26 could be a compression spring to pull the stem 24 upwardly along the longitudinal axis and hence remove any vertical play between the stem 24 and the housing unit 30. It is also considered to use the fastener 25 to remove any vertical play, with the fastener 25 abutting against any part of the housing unit 20.

Figure 4:
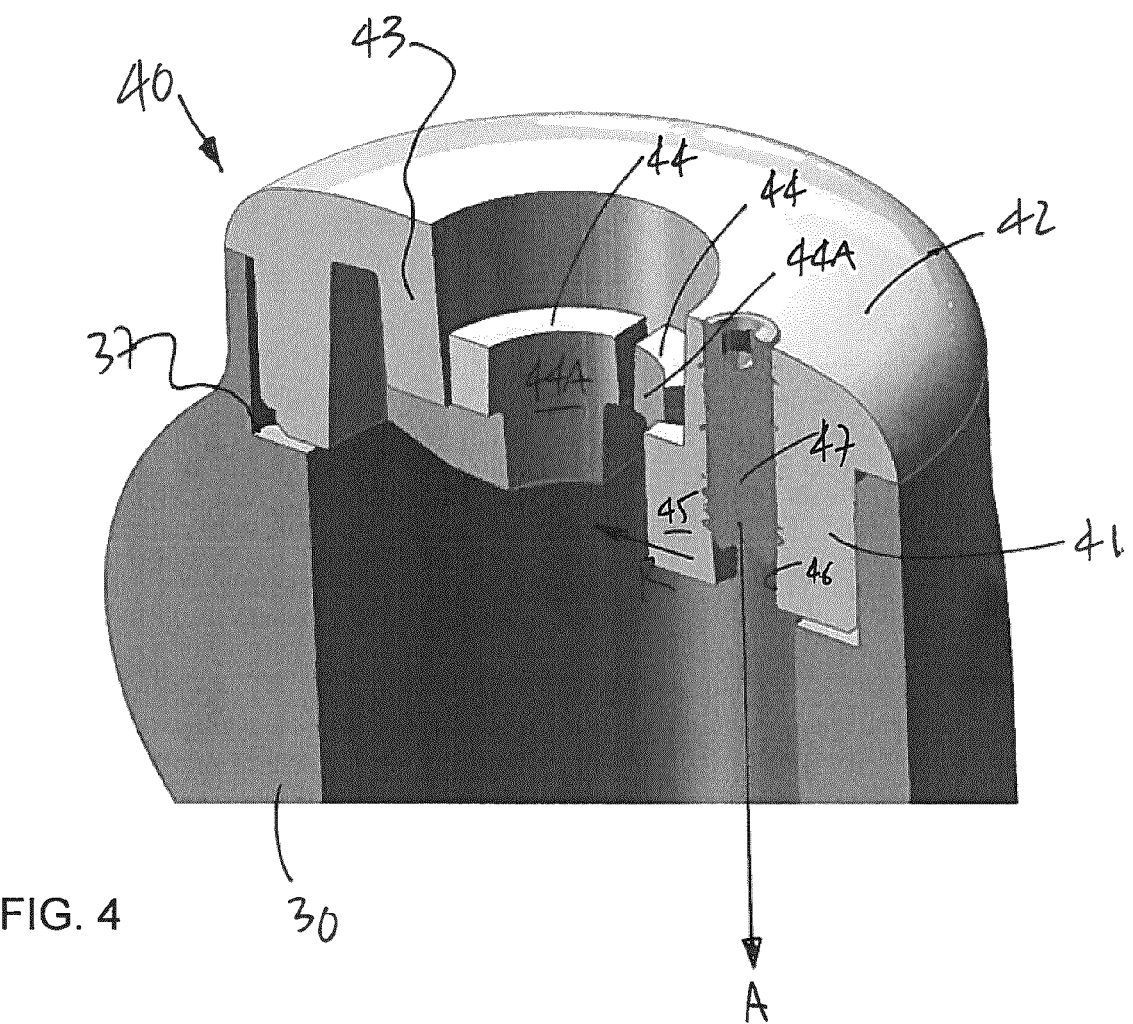
FIG. 4 is an axially-sectioned perspective view of a support assembly of the housing unit of FIG. 2.

Referring to FIGS. 2-4, the housing unit 30 is shown in greater detail. The housing unit 30 is the structural part of the caster assembly 20, in that it supports the caster wheel 21 by forming a swivel joint with the fork 23, while remaining fixed to the frame 12 of the wheelchair 10. The housing unit 30 has a hollow housing body 31 accommodating part of the stem 24 and other operative components allowing the swivelling. In an embodiment, the housing unit 30 is part of the frame 12 of the wheelchair 10, i.e., it is one of the tubes constituting the wheelchair frame 12. A pivot connector 32 may project laterally from a wall of the housing body 31, for being received in a corresponding tube or bore in the frame 12, as shown in FIG. 1. Therefore, unless anchored, the housing body 31 may rotate relative to the frame 12, for an orientation of the caster assembly 20 to be adjustable relative to the ground. This is one possible connection configuration, as the caster assembly 20 may also be without such orientation adjustment mechanism as well. In order to fix the housing body 31 once suitably oriented, the orientation adjustment mechanism may also include a pair of blocks 33 projecting laterally from a wall of the housing body 31 and having a space or gap between them. A screw 34A or like rod is retained at opposite ends by the blocks 33 and a portion thereof is exposed in the gap between the blocks 33. A torque arm 34B (a.k.a., link) has a first end pivotally connected to the screw 34A, and a second end pivotally connected to a collar 34C. As the collar 34C slides along a portion of the frame 12, the orientation of the housing body 31 is adjusted. The collar 34C may be locked to the frame 12, to block the rotation of the housing body 31 and hence fix the orientation of the housing body 31. This adjustment may be performed to determine the angle between the longitudinal axis of the stem 24 relative to the ground. In an embodiment, this adjustment may be done to bring the rotational axis of the stem 24 close to being normal to a plane upon which the wheelchair 10 lies with its four wheels.

Referring to FIGS. 3-5, the housing body 31 defines an inner cavity receiving the operative components allowing the swivelling movement, and the stem 24. The inner cavity may have a bottom counterbore 35 shaped to seatingly receive a bearing 36. According to an embodiment, the bearing 36 is force fitted or press fitted in the housing body 31 so as to be immovable. Other arrangements are contemplated, such as using a circlip, or circlips, lock nuts, set screws, etc, as alternatives or additionally to the arrangement of bottom counterbore 35. The housing body 31 may also have a top counterbore 37, shaped to seatingly receive an anti-flutter support assembly 40. Again, the support assembly 40 may also be force fitted or press fitted into the housing body 31 to come into abutment with the surfaces of the top counterbore 37. Other arrangements are contemplated, such as using a circlip, or circlips, lock nuts, set screws, etc. Both the bearing 36 and a plain bearing portion of the support assembly 40, as described hereinafter, are centered on the longitudinal axis, as the bearing 36 and the support assembly 40 rotatably support the stem 24 in forming a swivel joint.

Referring to FIGS. 3-5, the anti-flutter support assembly 40 is shown in greater details. With the bearing 36, the support assembly 40 rotatably supports the stem 24 to allow the swivel action of the caster wheel 21, and therefore acts as a bearing or as a support assembly. The support assembly 40 applies a variable amount of friction to the stem 24, such that sufficient friction may be selectively applied to lessen or cancel flutter, while not excessively opposing forces against the swivel action of the caster wheel 21.

The support assembly 40 has a base 41. According to an embodiment, the base 41 has an annular body (e.g., cylindrical body) that is sized to be received in the top end of the housing body 31, for instance with the annular base 41 seated in the counterbore 37 if present. Therefore, the dimension of the annular base 41 may be selected as a function of the manner by which it be received in the housing body 31 (e.g., force fit, press fit), or tube frame if the housing 30 is a tube of the frame 12 as suggested above. A cap 42 may be at a top of the annular base 41 and may optionally extend laterally or radially beyond the footprint of the annular base 41. Therefore, as shown in FIG. 4, the cap 42 may abut against a top edge of the housing body 31, and prevent further inward progress of the support assembly 40 into the housing body 31, although this function may also be performed by the surface of the counterbore 37 or like abutment (e.g., circlip used instead of the counterbore 37). As another possibility, the support assembly 40 is hung and supported by its cap 42 with the base 41 entering the housing body 31, absent a counterbore 37. In another embodiment, the base 41 is force fitted or press fitted into the housing body 31 or frame tube, without any cap 42. Other configurations are considered for the base 41, including a base constituted of a plurality of arcuate segments, or a quasi-annular body with C-section, etc. The shape of the base 41 is a function of the shape of the inner cavity of the housing body 31, which may have other shapes than a circle. The base 41 and the cap 42 concurrently define a hollow center. However, the cap 42 may be without such a hollow center. An annular support 43 is positioned in the hollow center, and defines a central bore of the support assembly 40. According to an embodiment the annular support 43 projects downwardly from the cap 42, and into the inner cavity of the housing body 31. Referring to FIGS. 4 and 5, bearing segments 44 project radially inwardly from the annular support 43, and each have a bearing surface 44A for sliding contact with the stem 24. The bearing surfaces 44A concurrently define a diametrical surface against which the stem 24 slides during rotation, i.e., a plain bearing. As shown in FIG. 5, the arrangement of the annular support 43 and of the bearing segments 44 defines a receptacle for receiving the head 25A of the fastener 25, with the biasing element 26 applying a tension force. The cooperation between the fastener 25 and the support assembly 40 ensures that the stem 24 remains captive in the housing unit 30. The support assembly 40 may have two or more of the bearing segments 44, although in an embodiment there are at least three of the bearing segments 44.

The support assembly 40 may cooperated with a pressure-applying component, that is operatively mounted to the support assembly 40. In an embodiment, the pressure-applying component is an integral part of the support assembly 40. According to an embodiment, the pressure-applying component applies a pressure on a wedge 45. In FIG. 4, the wedge 45 is in a gap between a pair of the bearing segments 44. The wedge 45 is a projection from the annular support 43, and is therefore cantilevered. A bore 46 is defined in the annular support 43, opening to the top surface of the cap 42. The bore 46 is threaded, such that a set screw 47 of the pressure-applying component may be operatively received therein. A rotation of the set screw 47 results in its translational displacement along the bore 46. The bore 46 is positioned so as to be adjacent to the wedge 45. Therefore, a downward movement of the set screw 47—as shown as A—results in a pressure applied to the wedge 45, causing a radially inward movement of the wedge 45—as shown as R, by way of elastic deformation for example. Consequently, the wedge 45 increases the gap between the pair of the bearing segments 44, resulting in an increase in a diameter formed concurrently by the bearing surfaces 44A. Inversely, an upward movement of the set screw 47—in a direction opposite to A—causes a radially outward movement of the wedge 45—in a direction opposite to R—due to the wedge's 45 tendency to return to an unloaded position (in which the wedge 45 applies little or no pressure on the bearing segment(s) 44, resulting in minimum diameter of the plain bearing of bearing segments 44). As a result of the upward movement of the set screw 47, the wedge 45 decreases the gap between the pair of the bearing segments 44, resulting in a decrease in a diameter formed concurrently by the bearing surfaces 44A, and therefore in an increase pressure and friction of the bearing surfaces 44A on the stem 24. The position of the set screw 47 along the bore 46 may be manually adjusted until a desired freedom of swivel is reached for the caster wheel 21.

It is contemplated to provide variations to the arrangement described above. According to an embodiment, the pressure-applying component applies a pressure on a single one of the bearing segments 44, instead of applying pressure on a wedge between a pair of bearing segments 44. In such a case, the pressure-applying component may be a plunger (such as the set screw 47) directly contacting a radially outward surface of one of the bearing segments 44. While the expression "plunger" is used, other words could also be used to define this embodiment of the pressure-applying component, such as a driver, a pin, a shaft. As alternatives to a plunger, the pressure-applying component may be a screwing ring, a detent, etc, among other possibilities. According to another embodiment, a plunger such as a set screw with or without a contact pad applies a pressure directly against the stem 24. According to an embodiment, aside from the set screw 47, the support assembly 40 is made of a monolithic integral construction, i.e., a single piece of a single material. For example, the support assembly 40 may consist of a monolithic block of a wear-resistant polymer, such as Iglide®, that may be molded or machined, although other materials are considered, such as PTFE, etc. However, the support assembly 40 may also be made of a composition of different pieces as well. It is desired that the wedge 45 deform in elastic deformation as it is displaced by the set screw 47. Likewise, the movement of the bearing segment(s) 44 as pressed by the pressure-applying component may be an elastic deformation. It is observed that a direction of translation of the set screw 47 is generally parallel to a longitudinal axis of the stem 24. In the case of a set screw configuration for the plunger, the direction of translation is parallel to the rotational axis of the set screw 47. The expression "generally parallel" entails that the translational direction may not be perfectly parallel to the longitudinal axis, hence a 5-10 degree variation (if not more) may be possible. This results in the plunger having its top interface end (e.g., the set screw 47 having its hexagonal socket) accessible from a top of the support assembly 40, and therefore from a top of the caster assembly 20, which may be ergonomically convenient. In an embodiment, the hexagonal socket is a 1.5 mm or a 2.0 mm socket. Alternatively, the set screw 47 could be oriented generally transversely to the rotational axis of the stem 24, among other possibilities. It is also considered to use alternative plungers to the set screw 47, such as a slidable pin, for example. Other arrangements are considered, such as a collar mounted to the bearing segments 44 and movable along direction A to cause radial displacement of the bearing segments 44, to increase or decrease the pressure applied on the stem 24.

In order to assemble and remove the flutter with the caster assembly 20, the stem 24 supporting the caster wheel 21 is firstly inserted in the housing unit 30, in the manner shown in FIG. 5, but without the fastener 25 to allow the stem 24 to be inserted. The fastener 25 is then used to hold the stem 24 captive in the housing unit 30. If a biasing element 26 is used, it is sandwiched between the fastener 25 and the bearing segments 44, to remove any vertical play (i.e., along the longitudinal axis). At this point, the freedom of swivel movement may be assessed. If the caster wheel 21 is determined to be too loose in swivelling, the pressure-applying component may be adjusted for the bearing segments 44 to apply more friction on the stem 24. According to an embodiment, the pressure is applied by displacing the set screw 47 upwardly, conventionally by counterclockwise rotation. This may be done incrementally, until a suitable freedom of swivel is reached. To the contrary, if the caster wheel 21 is determined to be too restrained in swivelling, the pressure-applying component may be adjusted for the bearing segments 44 to apply less friction on the stem 24. According to an embodiment, the pressure is released by displacing the set screw 47 downwardly, conventionally by clockwise rotation.

While a specific configuration of the support assembly 40 is detailed above, other configurations are considered. In a non-exhaustively list of exemplary configurations, the annular support 43 is directly mounted to the housing body 31, the bearing segments 44 project from the base 41 or from the cap 42, etc.

The invention claimed is:

1. A housing unit for a caster assembly comprising:
   a hollow housing body forming an inner cavity;
   a first bearing connected to the hollow housing body, the first bearing defining a rotational axis through its center, and configured to rotatably support a first portion of a stem supporting a caster for rotation about the rotational axis;
   a support assembly connected to the hollow housing body, the support assembly being spaced from the first bearing, the support assembly having bearing segments concurrently defining a plain bearing around the rotational axis, the plain bearing configured to rotatably support a second portion of the stem during rotation about the rotational axis; and
   a pressure-applying component operatively mounted to the support assembly, the pressure-applying component being selectively displaceable to displace at least one of the bearing segments toward or away from the second portion of the stem, to increase or decrease a pressure of the bearing segments on the second portion of the stem;
   wherein the support assembly and the first bearing are configured to rotatably support the stem of the caster to form a swivel joint.

2. The housing unit according to claim 1, further comprising a wedge positioned in a gap between two of the bearing segments, a displacement of the pressure-applying component causing a wedging effect of the wedge on the two of the bearing segments.

3. The housing unit according to claim 2, wherein the wedge and the bearing segments are integrally formed into a monolithic piece.

4. The housing unit according to claim 1, wherein the bearing segments are connected to an annular support.

5. The housing unit according to claim 4, wherein the bearing segments and the annular support concurrently define a receptacle configured to receive a fastener or head of the stem.

6. The housing unit according to claim 4, further comprising a cap for being mounted to a top open end of the hollow housing body.

7. The housing unit according to claim 6, further comprising an annular body projecting downwardly from the cap and for being received in the inner cavity via the top open end.

8. The housing unit according to claim 7, wherein the cap forms a flange relative to the annular body.

9. The housing unit according to claim 6, wherein the cap has a top opening configured for receiving a top of the stem.

10. The housing unit according to claim 1, further comprising a pivot connector on the hollow housing body adapted for pivoting engagement to a frame of a wheelchair.

11. The housing unit according to claim 10, further comprising a collar adapted to be slidingly engaged on the frame of the wheelchair, and an arm pivotally connected to the collar and the housing body to convert a translation of the collar along the frame to a rotation of the housing body via the pivot connector.

12. The housing unit according to claim 1, wherein the pressure-applying component is a plunger translating relative to the support assembly to displace the at least one of the bearing segments.

13. The housing unit according to claim 12, wherein a direction of translation of the plunger is generally parallel to the rotational axis.

14. The housing unit according to claim 12, wherein the plunger has a top interface end accessible from a top surface of the support assembly.

15. The housing unit according to claim 12, wherein the plunger is a screw received in a threaded hole of the support assembly.

16. The housing unit according to claim 1, wherein the support assembly is a monolithic component.

17. The housing unit according to claim 1, wherein the plain bearing has at least three of the bearing segments separated from one another by a gap.

18. A system of a housing unit and caster assembly comprising:
the housing unit according to claim 1; and
the caster assembly including the stem, a caster and means to rollingly support the caster at an end of the stem.

19. The system according to claim 18, wherein the first portion of the stem and the second portion of the stem are cylindrical, the second portion of the stem having a smaller diameter than the first portion of the stem.

20. The system according to claim 18, wherein the stem has an open threaded top end, the caster assembly further comprising a bolt operatively engaged into the open threaded top end of the stem to hold the caster assembly to the housing unit.

21. The housing unit according to claim 18, wherein the means is a fork rollingly supporting the caster at the end of the stem.

* * * * *